UNITED STATES PATENT OFFICE.

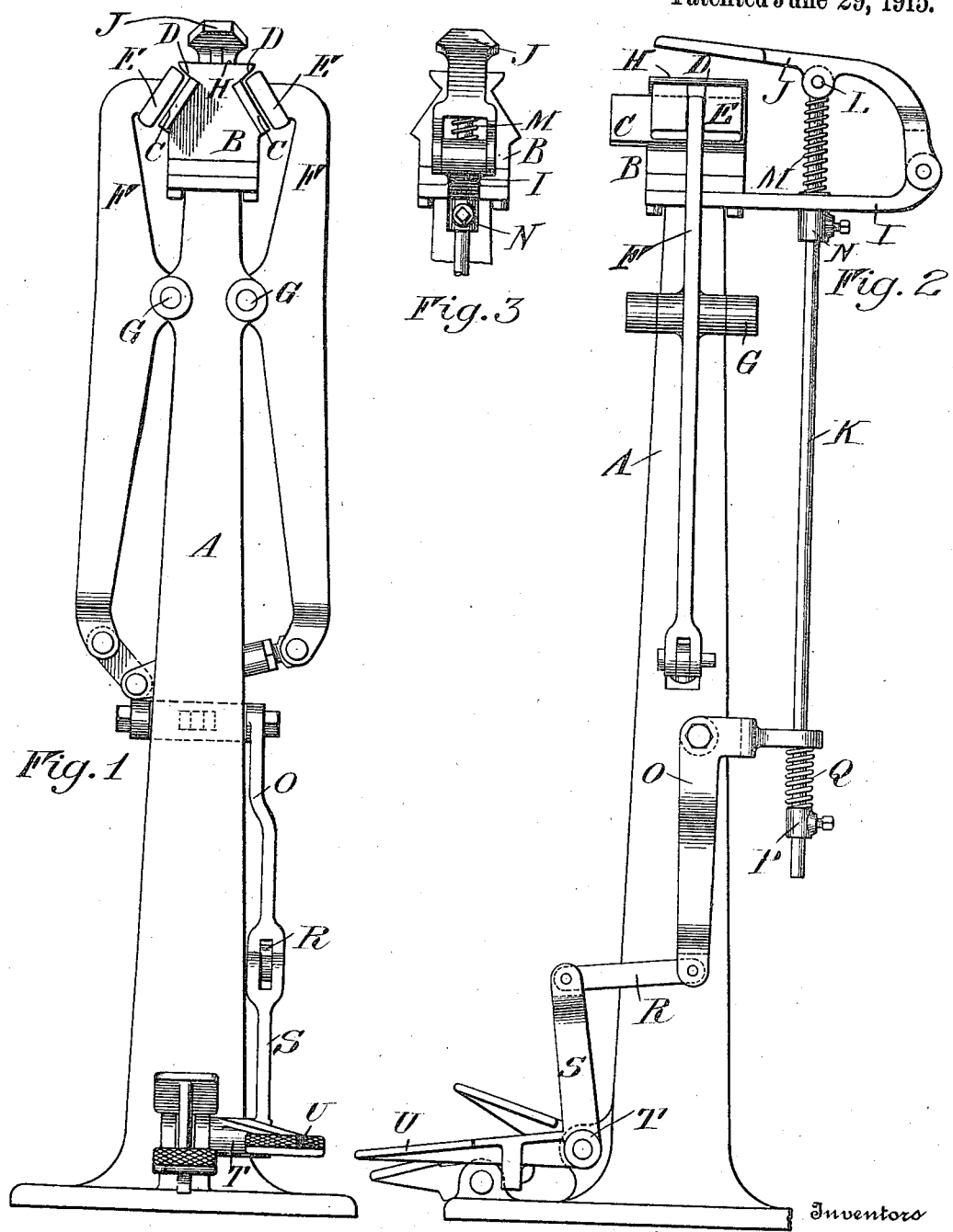

ARTHUR T. HAGEN AND GOTTLOB BINDER, OF ROCHESTER, NEW YORK, ASSIGNORS TO AMERICAN LAUNDRY MACHINERY COMPANY, OF CINCINNATI, OHIO, A CORPORATION OF OHIO.

COLLAR-TIPPING MACHINE.

1,144,541. Specification of Letters Patent. Patented June 29, 1915.

Application filed May 4, 1914. Serial No. 836,347.

*To all whom it may concern:*

Be it known that we, ARTHUR T. HAGEN and GOTTLOB BINDER, both of Rochester, in the county of Monroe and State of New York, have invented certain new and useful Improvements in Collar-Tipping Machines; and we do hereby declare the following to be a full, clear, and exact description of the same, reference being had to the accompany drawings, forming a part of this specification, and to the reference-numerals marked thereon.

Our invention relates to ironing machinery, and more especially to the class of apparatus known as collar tipping machines, which are designed for pressing the wing portions of standing collars, that is to say, for pressing the wings in their proper angular relation to the body of the collar, and our invention has for its principal object to provide a machine of this type with conveniently arranged supplemental means for pressing the wing down against the collar and shaping it properly in finishing.

Another purpose of the improvement is to afford a simple arrangement of parts, and to provide means for regulating the pressure that is applied, to prevent the application of excessive pressure to the wing when folded upon the collar, which otherwise would result in breaking or cutting the collar along the fold line of the wing.

To these and other ends the invention resides in certain improvements and combinations of parts all as will be hereinafter more fully described, the novel features being pointed out in the claims at the end of the specification.

In the drawings: Figure 1 is a view in front elevation of a collar tipping machine showing the application of one form of the invention; Fig. 2 is a side elevation, and Fig. 3 is a partial rear elevation.

Similar reference characters in the several figures indicate the same parts.

In the construction illustrated, A designates the frame or pedestal of the machine upon which the operating parts are supported, and it is provided at its upper end with a bed B which is hollow and may be heated by supplying steam or other suitable heating fluid. The bed B is provided with a pair of inclined collar engaging surfaces C at the sides, which are arranged at a suitable angle to the upwardly diverging surfaces D, thereby forming an angle, the apex of which receives the fold line between the wing and the body of the collar for the initial wing pressing operation. Coöperating with the surfaces C are pressers E of suitable construction which are mounted on the jaws F pivoted to the frame at G. The jaws F are connected to a suitable treadle operated mechanism and adapted to be simultaneously moved in opposite directions. The parts which have thus far been described are disclosed in the patent of Hagen and Cooper, No. 994,512, June 6, 1911, and it is the present purpose to afford means that will enable the operator to finish the collar by a supplemental finishing operation that can be effected on the same machine, and results in pressing the wing closely against the body of the collar after the latter has been rounded and shaped, and this causes the wing to assume its proper position and to maintain the same relation to the body of the collar that it possesses when shaped. In order to accomplish this, there is provided an additional collar engaging surface and a supplemental pressing member for coöperation with the said surface.

The heated bed B embodies at its top a horizontally disposed collar engaging surface H which is heated by the same means that supplies heat to the surfaces C.

Mounted on the frame A is a rearwardly extending arm I, at the rear of which is pivotally mounted the pressing member J having coöperation with the horizontal collar engaging surface H. The pressing member J is operated by the vertically disposed rod K which passes through a suitable opening in the arm I and is pivoted to the pressing member at L.

M is a spring arranged between the arm I and the pressing member, surrounding the rod K, and acting to hold the pressing member normally elevated in the manner shown in Fig. 2.

N is an adjustable collar mounted on the rod K and adapted to engage the arm I so as to limit the upward movement of the rod and pressing member. The rod K is actuated downwardly by suitable treadle controlled means, and to this end there is provided a bell crank O pivoted upon the frame and provided with an opening to receive the rod K. The latter carries an adjustable stop P at its lower end, and arranged above said stop is a spring Q which engages the lower face of the horizontal arm of the bell crank lever O so that when the latter is operated it moves the rod K downwardly with a yielding pressure, and thereby prevents the pressing member from engaging the wing of the collar under excessive pressure. The lower arm of the bell crank O is connected by a link R to a lever S which is formed upon a rotary sleeve T provided with an operating treadle U.

In the operation of the machine, the collar is first placed with the wings in engagement with the surfaces C, the fold lines being coincident with the apexes of the angles formed by the surfaces C and D, and the jaws are then closed. Upon releasing the jaws F, one end of the collar is placed upon the pressing surface H, and the treadle U is operated, causing the presser J to move downwardly and to press the wing against the body of the collar with sufficient pressure so that when released it will assume the proper angle. The degree of pressure under which the pressing member engages the collar can be determined by a preliminary adjustment, and the yieldable character of the actuating parts obviates breaking the collar along the fold line of the wing or causing sharp projections along the edge of the collar.

The construction affords a simple mechanism, that can be readily controlled, and is quite effective in its operation, combining in a single machine a unique means for finishing the wings of a collar, and thereby giving the desired finish to a collar of this type.

We claim as our invention:

1. In a collar tipping machine, the combination with a heated bed having inclined collar engaging surfaces at the sides and a horizontal collar engaging surface at the top, of jaws coöperating with said inclined surfaces, and a pressing member having coöperation with said horizontal top surface.

2. In a collar tipping machine, the combination with a heated bed having inclined collar engaging surfaces at the sides and a horizontal collar engaging surface at the top, of jaws pivoted at the sides of the machine and coöperating with said inclined surfaces, and a pressing member pivoted at the rear of the machine and having coöperation with said horizontal top surface.

ARTHUR T. HAGEN.
GOTTLOB BINDER.

Witnesses:
H. E. STONEBRAKER,
RUSSELL B. GRIFFITH.